United States Patent
Meador

(10) Patent No.: US 6,668,846 B2
(45) Date of Patent: Dec. 30, 2003

(54) GYROSCOPICALLY BALANCED WALKING CANE

(76) Inventor: Edward L. Meador, 6509 Ridgeway Dr., Springfield, VA (US) 22150

( * ) Notice: Subject to any disclaimer, the term of this patent is extended or adjusted under 35 U.S.C. 154(b) by 0 days.

(21) Appl. No.: 10/294,579

(22) Filed: Nov. 15, 2002

(65) Prior Publication Data

US 2003/0089389 A1 May 15, 2003

Related U.S. Application Data

(60) Provisional application No. 60/331,396, filed on Nov. 15, 2001.

(51) Int. Cl.$^7$ ................................................ A45B 9/00
(52) U.S. Cl. ....................................................... 135/65
(58) Field of Search ........................... 135/65, 66, 911; 74/5 R, 5.6 E, 5.22; 310/90.5

(56) References Cited

U.S. PATENT DOCUMENTS

| | | | | |
|---|---|---|---|---|
| 3,787,100 A | * | 1/1974 | Habermann et al. ...... 74/5 R X |
| 5,097,856 A | * | 3/1992 | Chi-Sheng ............... 135/911 X |
| 5,542,672 A | * | 8/1996 | Meredith ...................... 463/37 |
| 5,687,136 A | * | 11/1997 | Borenstein .................. 367/116 |
| 5,973,618 A | * | 10/1999 | Ellis ........................ 135/911 X |
| 6,489,605 B1 | * | 12/2002 | Ritz et al. .................... 250/221 |

FOREIGN PATENT DOCUMENTS

DE          4316284          * 11/1994

* cited by examiner

Primary Examiner—James O. Hansen
(74) Attorney, Agent, or Firm—Welsh & Flaxman LLC

(57) ABSTRACT

A walking cane is disclosed which substantially maintains its position despite attempts to move or deflect the cane. The walking can includes an elongated, longitudinally extending member having a first end and a second end, the first end being shaped and dimensioned for engaging a support surface and the second end being shaped and dimensioned for gripping by an individual using the present walking cane. The walking cane further includes a gyroscope integrally associated with the longitudinally extending member. The gyroscope is selectively rotated to generate angular momentum substantially preventing movement or deflection of the cane from a desired orientation.

14 Claims, 3 Drawing Sheets

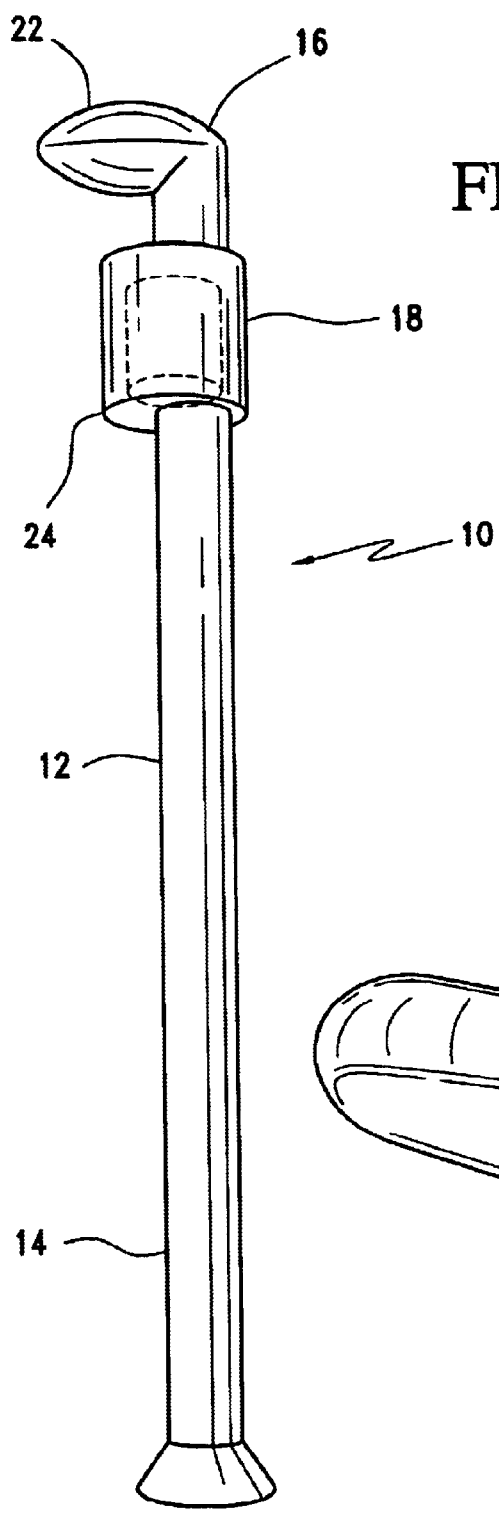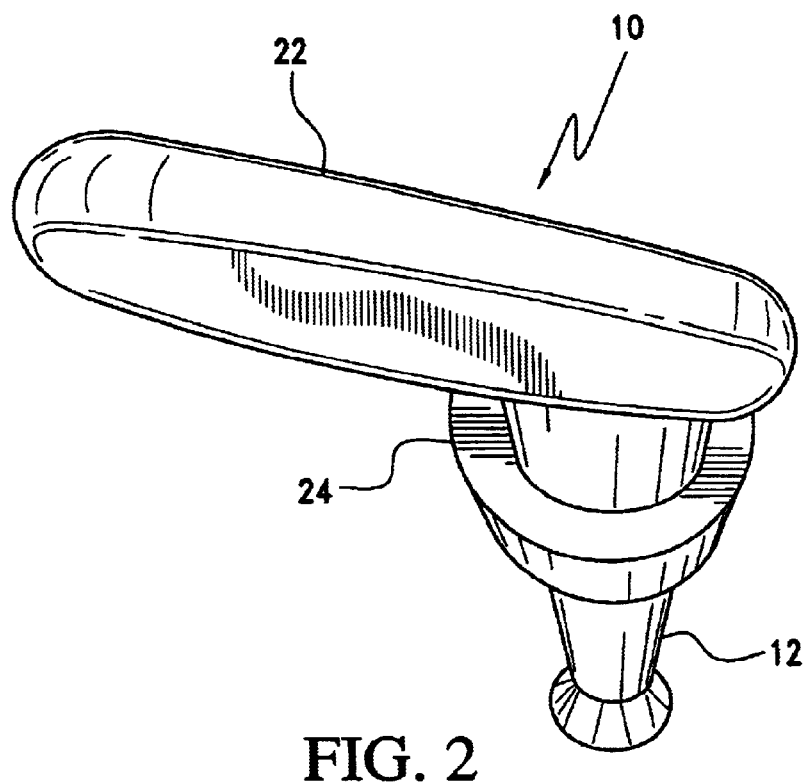

GYROSCOPICALLY BALANCED WALKING CANE

CROSS REFERENCE TO RELATED APPLICATIONS

This application is a nonprovisional of U.S. Provisional Application No. 60/331,396, filed Nov. 15, 2001, entitled "GYSCOPICALLY BALANCED WALKING CANE".

BACKGROUND OF THE INVENTION

1. Field of the Invention

The invention relates to a walking cane. More particularly, the invention relates to a walking cane including an integrally formed gyroscope resisting movement or deflection of the walking cane.

2. Description of the Prior Art

Canes are commonly used by individuals to provide for added stability as the individual walks or stands. However, the inherent nature of canes dictates that their stability be limited by the fact that canes are free to move, flex and bend as the individual moves from one point to another. In fact, gravity is always attempting to move a cane from its working vertical orientation to a horizontal orientation lying on the ground. Similarly, lateral forces are commonly encountered which move the cane from its desired vertical orientation.

Attempts have been made to add to the stability of canes by providing canes with a wider area of contact through the provision of multiple legs contacting spaced apart points on the floor. Each leg typically includes a rubber tip that enhances gripping contact with the floor, as well as serving the additional purpose of absorbing shock.

While multiple leg canes do add stability, they remain subject to the effects of lateral forces which may work to reduce the stability of the cane. With this in mind, a need continues to exist for a walking cane which provides individuals with additional stability as they move from point to point, or simply stand still. The present invention provides such a cane.

SUMMARY OF THE INVENTION

It is, therefore, an object of the present invention to provide a walking cane which substantially maintains its position despite attempts to move or deflect the cane. The walking can includes an elongated, longitudinally extending member having a first end and a second end, the first end being shaped and dimensioned for engaging a support surface and the second end being shaped and dimensioned for gripping by an individual using the present walking cane. The walking cane further includes a gyroscope integrally associated with the longitudinally extending member. The gyroscope is selectively rotated to generate angular momentum substantially preventing movement or deflection of the cane from a desired orientation.

It is also an object of the present invention to provide a walking cane wherein the gyroscope is housed within a housing chamber integrally associated with the longitudinally extending member.

It is another object of the present invention to provide a walking cane wherein the housing member is vacuum-sealed.

It is a further object of the present invention to provide a walking cane wherein the housing member is formed of a carbon fiber composite.

It is also another object of the present invention to provide a walking cane wherein the gyroscope includes a flywheel and bearings supporting the flywheel.

It is yet another object of the present invention to provide a walking cane wherein the bearings are magnetic bearings.

It is also an object of the present invention to provide a walking cane wherein the flywheel is formed of a carbon fiber.

It is a still a further object of the present invention to provide a walking cane wherein the gyroscope includes a flywheel and bearings supporting the flywheel.

It is another object of the present invention to provide a walking cane wherein the bearings are magnetic bearings.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a perspective view of a walking cane in accordance with the present invention.

FIG. 2 is a tope view of the walking can shown in FIG. 1.

DESCRIPTION OF THE PREFERRED EMBODIMENT

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 3:
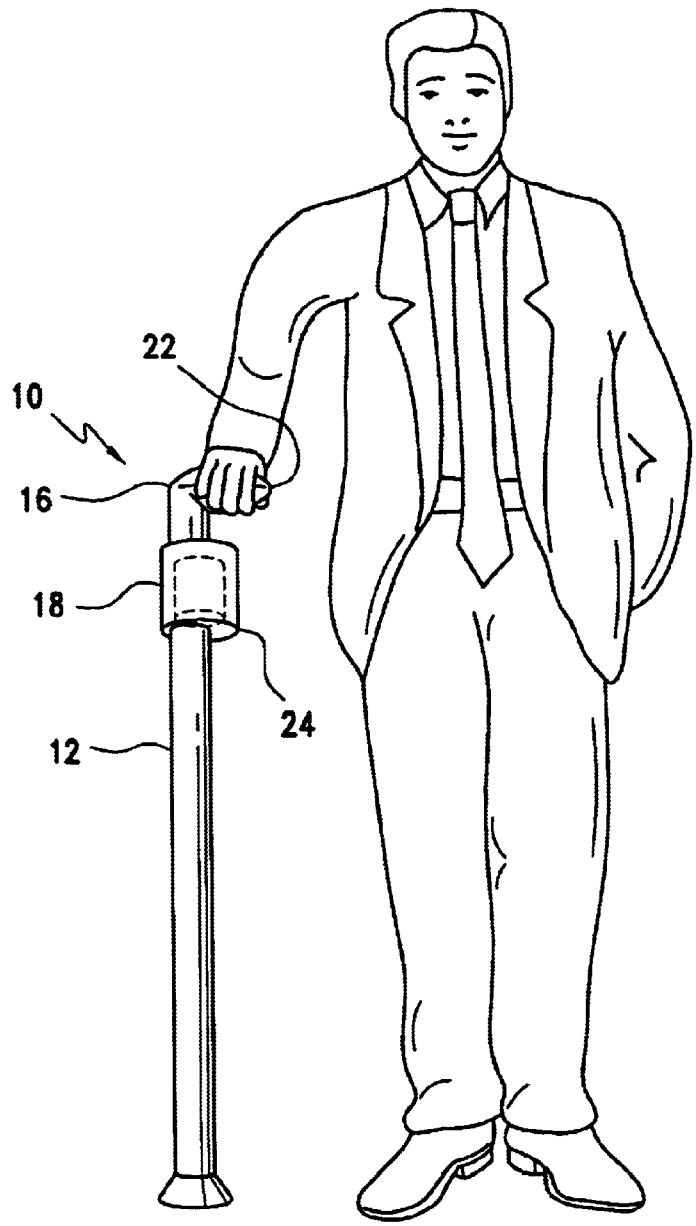
FIG. 3 is a schematic showing an individual walking with the present walking cane.

With reference to FIGS. 1, 2 and 3, a walking cane 10 is disclosed which substantially maintains its position despite attempts to move or deflect the cane 10. The walking cane 10 generally includes an elongated, longitudinally extending member 12 having a first end 14 and a second end 16. The first end 14 of the walking can 10 is shaped and dimensioned for engaging a support surface and the second end 16 is shaped and dimensioned for gripping by an individual using the present walking cane 10. The walking cane 10 further includes a gyroscope 18 integrally associated with the longitudinally extending member 12. The gyroscope 18 selectively rotates to generate angular momentum substantially preventing movement or deflection of the cane 10 from a desired orientation.

Figure 4:
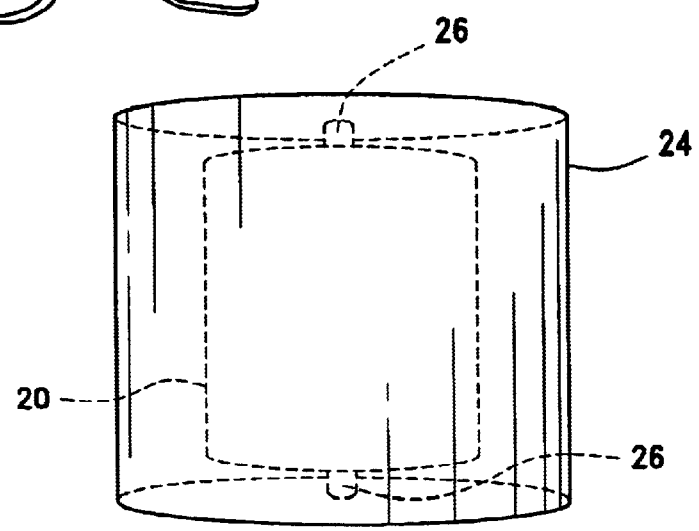
FIG. 4 is a detailed view showing the internal structure of a gyroscope in accordance with the present invention.

Briefly, the present invention relies upon the angular momentum and inertial force generated by a gyroscope 18 to maintain the walking cane 10 in an upright position and consequently provide stability to users of the present walking cane 10. As such, and with reference to FIG. 4, when the gyroscope 18 of the present walking cane is switched "on", the flywheel 20 of the gyroscope 18 will begin spinning rapidly, generating angular momentum which functions to resist any attempt to move or deflect the walking cane 10 from the position it held prior to turning the gyroscope 18 "on". The inertial force generated by the gyroscope 18, and the walking cane 10, is strong enough to provide a firm, continuous sense of security and rigidity, but is not so strong that the cane 10 may not be easily moved. For example, in the case of elderly individuals using the present walking cane 10, the inertial force will be felt as a firm opposition to any attempt to change the cane's upright orientation.

As those skilled in the art will certainly appreciate, one using a walking cane as he or she walks will swing the walking cane through an arc as both the individual and the walking cane move forward to the next point at which the walking cane is forced into contact with a support surface. During movement through this arc, the walking cane is commonly moved from a generally vertical orientation at which the cane contacts the support surface to an obliquely oriented position as the walking cane is moved to its next contact point. It is, however, critical that the walking cane be reoriented from this oblique orientation to a substantially vertical orientation before the walking cane makes contact with the support surface. The present walking cane, through the application of force provided by the gyroscope, consistently urges the walking cane to the desired vertical orientation.

Figure 5:
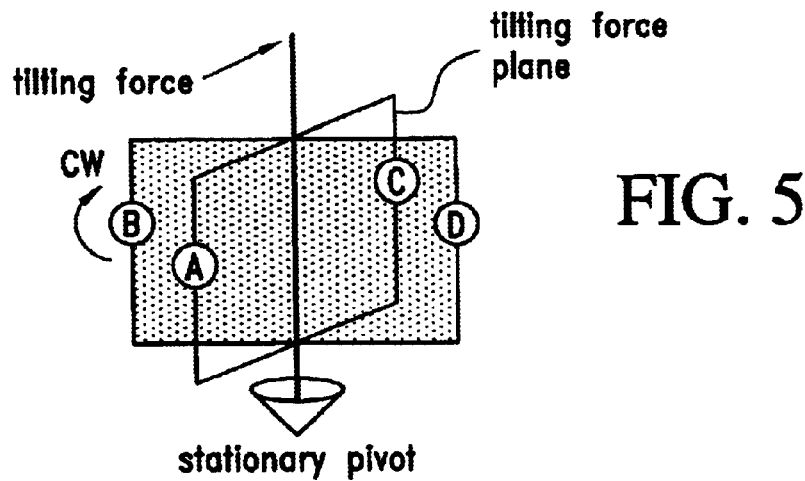
FIGS. 5, 6 and 7 are schematics used to demonstrate the function of a gyroscope.
Figure 6:
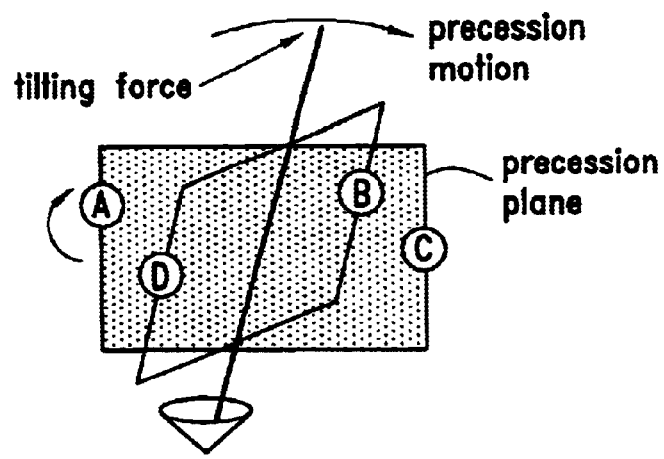
Figure 7:
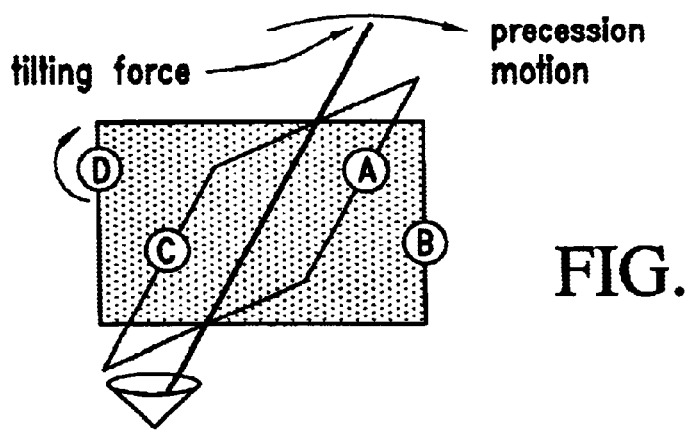

As background to the following discussion, and with reference to FIGS. 5 to 7, a gyroscope is constructed so that its spinning wheel is supported beneath its center of gravity and is isolated from any external torques. When the gyroscope spins rapidly, either mechanically or by electrical power, it has a large amount of conserved physical energy, i.e., angular momentum.

If nothing interferes with or tries to transfer the angular momentum to or from the gyroscope, it will continue to spin about a fixed axis. Thus, the gyroscope's angular momentum works to keep the device in its initial direction, even if the frame of the gyroscope is tilted.

Instead of a complete rim, four point masses, A, B, C, D, represent the areas of the rim that are most important in visualizing how a gyro works. The bottom axis is held stationary but can pivot in all directions.

When a tilting force is applied to the top axis, point A is sent in an upward direction and C goes in a downward direction (see FIG. 5). Since this gyroscope is rotating in a clockwise direction, point A will be where point B was when the gyroscope has rotated 90 degrees. The same goes for point C and D. Point A is still traveling in the upward direction when it is at the 90 degrees position in FIG. 6, and point C will be traveling in the downward direction. The combined motion of A and C cause the axis to rotate in the "precession plane" to the right (see FIG. 6). This is called precession. A gyroscope's axis will move at a right angle to a rotating motion; in this case to the right. If the gyroscope were rotating counterclockwise, the axis would move in the precession plane to the left. If in the clockwise example the tilting force was a pull instead of a push, the precession would be to the left.

When the gyroscope has rotated another 90 degrees (see FIG. 7), point C is where point A was when the tilting force was first applied. The downward motion of point C is now countered by the tilting force and the axis does not rotate in the "tilting force" plane. The more the tilting force pushes the axis, the more the rim on the other side pushes the axis back when the rim revolves around 180 degrees.

Actually, the axis will rotate in the tilting force plane in this example. The axis will rotate because some of the energy in the upward and downward motion of A and C is used up in causing the axis to rotate in the precession plane. Then when points A and C finally make it around to the opposite sides, the tilting force (being constant) is more than the upward and downward counteracting forces.

Referring once again to FIGS. 1 to 4, the longitudinally extending member 12 of the present walking cane 10 generally includes a first end 14 adapted for engaging a support surface and a second end 16 adapted for gripping by the user of the present walking cane 10. In accordance with a preferred embodiment of the present invention, the longitudinally extending member 12 is a molded, all-composite 36"×⅞", elliptically shaped, hollow tube. The member 12 is curved at the second end 16, creating a 4-inch handle 22 shaped and dimensioned fit the hand of a user. In accordance with a preferred embodiment of the present invention, the member 12 is constructed of a braided carbon-fiber composite, although those skilled in the art will understand that other materials typically used in the manufacture of canes may be used without departing from the spirit of the present invention.

The gyroscope 18 itself is housed within a small housing chamber 24 integrally formed with the longitudinally extending member 12. The housing chamber 24 is shaped and dimensioned to provide a secure storage space for the gyroscope 18 within the longitudinally extending member 12. In accordance with a preferred embodiment of the present invention, the housing chamber 24 is a vacuum-sealed, braided carbon fiber composite chamber. The construction of the housing chamber 24 from a braided, or woven, carbon fiber composite offers exceptional strength in combination with lightweight, and, as such, is an ideal material for use in conjunction with a walking cane 10 where weight and strength are a critical element. While a braided, or woven, carbon fiber composite is disclosed in accordance with a preferred embodiment of the present invention, other materials offering desired structural characteristics may be employed without departing from the spirit of the present invention.

In accordance with a preferred embodiment of the present invention, the gyroscope 18 includes a small gyroscope flywheel 20, approximately 2"×6", which is powered by batteries which maybe rechargeable and motor (not shown). While a conventional disk shaped flywheel is disclosed in accordance with a preferred embodiment of the present invention, other gyroscope "flywheel" structures may be employed without departing from the spirit of the present invention. For example, an elongated, slightly elliptically shaped flywheel may be encased within the longitudinally extending member without significantly increasing the diameter of the flywheel. In accordance with such an embodiment, the "fly-cylinder" might be 12 to 16 inches in length, but with a diameter no greater than 1 inch.

As mentioned above, the gyroscope 18 is housed within a vacuum-sealed housing chamber 24 and the flywheel 20 of the gyroscope is held in place by low friction magnetic bearings 26 above and below the flywheel 20. By vacuum sealing the gyroscope 18 within the housing chamber 24, friction is reduced and power is dramatically increased.

In accordance a preferred embodiment of the present invention, and in an effort to provide for reduced friction support is desired, the flywheel 20 of the gyroscope 18 is supported by magnetic bearings 26. Magnetic bearings are rugged, simple in design, reliable and friction free. They are suitable for operation in a vacuum. A more detailed discussed of a magnetic bearing system for use in conjunction with a gyroscope is disclosed in U.S. Pat. No. 3,787,100, entitled "DEVICES INCLUDING ROTATING MEMBERS SUPPORTED BY MAGNETIC BEARINGS", which is incorporated herein by reference. The use of magnetic bearings 26 in accordance with the present invention makes it possible to spin the flywheel 20 with extremely low rotating losses, thereby, increasing the power output by the gyroscope 18.

As with the housing chamber 24, the flywheel 20 of the gyroscope 18 is constructed of a braided carbon-fiber composite, although other materials may be employed without departing from the spirit of the present invention.

In use, the present walking cane 10 is operated by activating the flywheel 20 of the gyroscope 18 while the walking cane 10 is in a vertical orientation. Actuation of the walking can 10 is achieved via a conventional on/off switch which is linked to the batteries providing the energy for spinning the flywheel 20. Once the flywheel 20 reaches its predetermined velocity, sufficient inertial force will be generated to maintain the walking cane 10 in its vertical orientation.

Initial calculations suggest that a carbon fiber flywheel of a size of approximately 2"×6" will need to spin at a rate of 30,000 rpm to provide the present walking cane with the desired inertial force. If, however, higher spinning speeds are required, it is contemplated to insert an elastomeric, expandable layer to be molded into the flywheel near the outer rim thereof. This layer will act as a self-actuating brake; that is, as the wheel comes into contact with the chamber wall, friction is created which immediately slows the flywheel.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A walking cane which substantially maintains its position despite attempts to move or deflect the cane from a vertical orientation, consisting essentially of:
   an elongated, longitudinally extending member having a first end and a second end, the first end including a ground engaging member being shaped and dimensioned for engaging a support surface and the second end including a handle being shaped and dimensioned for gripping by an individual using the present walking cane;
   a gyroscope housing integrally associated with the longitudinally extending member, the gyroscope housing consisting of a housing chamber and a gyroscope mounted within the housing, the gyroscope selectively rotating to generate angular momentum substantially preventing movement or deflection of the cane from a desired orientation.

2. The walking cane according to claim 1, wherein the housing chamber is vacuum-sealed.

3. The walking cane according to claim 1, wherein the housing chamber is formed of a carbon fiber composite.

4. The walking cane according to claim 1, wherein the gyroscope includes a flywheel and bearings supporting the flywheel.

5. The walking cane according to claim 4, wherein the bearings are magnetic bearings.

6. The walking cane according to claim 5, wherein the flywheel is formed of a carbon fiber.

7. The walking cane according to claim 1, wherein the longitudinally extending member is formed of a carbon fiber composite.

8. The walking cane according to claim 1, wherein the gyroscope is housed within a housing chamber integrally associated with the longitudinally extending member, the housing chamber being vacuum sealed and formed of a carbon fiber composite, and the gyroscope including a carbon fiber composite flywheel and magnetic bearings supporting the flywheel.

9. The walking cane according to claim 1, wherein the gyroscope is secured to the longitudinally extending member between the first end and the second end.

10. A walking cane which substantially maintains its position despite attempts to move or deflect the cane from a vertical orientation, comprising:
    a rigid elongated, longitudinally extending member having a first ends and a second end and a longitudinal axis, the first end being shaped and dimensioned for engaging a ground support surface and the second end being shaped and dimensioned as a handle for gripping by an individual using the present walking cane and supporting the weight of the present user when the second end engages the ground support surface; the handle being generally perpendicular to the longitudinal axis of the extending member;
    a gyroscope secured to the longitudinally extending member between the first end and the second end, the gyroscope selectively rotating to generate angular momentum substantially preventing movement or deflection of the cane from a desired orientation thereby causing the ground engaging end to lie parallel to the ground support surface upon contact.

11. A walking cane which substantially maintains its position despite attempts to move or deflect the cane from a vertical orientation, comprising:
    an elongated, longitudinally extending member having a first end and a second end, the first end being shaped and dimensioned for engaging a support surface and the second end being shaped and dimensioned for gripping by an individual using the present walking cane;
    a gyroscope integrally associated with the longitudinally extending member, the gyroscope selectively rotating to generate angular momentum substantially preventing movement or deflection of the cane from a desired orientation, wherein the gyroscope includes a flywheel and bearings supporting the flywheel.

12. The walking cane according to claim 11, wherein the bearings are magnetic bearings.

13. The walking cane according to claim 12, wherein the flywheel is formed of a carbon fiber composite.

14. The walking cane according to claim 11, wherein the flywheel is formed of a carbon fiber composite.

* * * * *